(12) United States Patent
Kawamura

(10) Patent No.: US 7,110,996 B2
(45) Date of Patent: Sep. 19, 2006

(54) SYSTEM AND METHOD FOR DETERMINING NUMERICAL REPRESENTATIONS FOR CATEGORICAL DATA FIELDS AND DATA PROCESSING SYSTEM

(75) Inventor: Tateo Kawamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 10/366,833

(22) Filed: Feb. 14, 2003

(65) Prior Publication Data

US 2003/0163462 A1   Aug. 28, 2003

(30) Foreign Application Priority Data

Feb. 22, 2002   (JP) ............... 2002-046934

(51) Int. Cl.
*G06F 17/30* (2006.01)
(52) U.S. Cl. .......................... 707/3; 715/515
(58) Field of Classification Search ........... 707/1–10, 707/100–104.1, 200–205
See application file for complete search history.

(56) References Cited

U.S. PATENT DOCUMENTS

| 5,826,261 | A | * | 10/1998 | Spencer | .......... 707/5 |
|---|---|---|---|---|---|
| 5,974,412 | A | * | 10/1999 | Hazlehurst et al. | ............ 707/3 |
| 6,772,150 | B1 | * | 8/2004 | Whitman et al. | ............ 707/6 |
| 2005/0108200 | A1 | * | 5/2005 | Meik et al. | ................... 707/3 |

FOREIGN PATENT DOCUMENTS

| JP | 09-006794 | 1/1997 |
|---|---|---|
| JP | 09-062658 | 3/1997 |
| JP | 2002-046934 | 10/2005 |

\* cited by examiner

*Primary Examiner*—Mohammad Ali
(74) *Attorney, Agent, or Firm*—Samuel A. Kassatly

(57) ABSTRACT

A system and method execute search and retrieval techniques relative to previously stored documents. The present method conducts a first search based on key words or phrases, receives the selection of a given document relative to a result of the first search, and then conducts a second search based on the selected given document. If in the second search the given document was extracted in a previous retrieval process made by a user, a document having a history of being selected concurrently with the given document is extracted. Any document concurrently selected by the user with respect to the document extracted in the second search is automatically stored and noted as being associated with the search request.

15 Claims, 14 Drawing Sheets

| MAIN | | | |
|---|---|---|---|
| SELECTED DOCUMENT LIST | | | |

| DOCUMENT ID | TITLE | SELECTION | |
|---|---|---|---|
| | | ☐ | |
| | | ☐ | |
| | | ☐ | |
| | | ☐ | |
| | | ☐ | |
| | | ☐ | |
| | | ☐ | |

[ANALOGOUS DOCUMENT SEARCH] [EXCLUDE FROM LIST] [SELECT ALL] [CANCEL ALL]
[FULL TEXT SEARCH] ~ 50    [END]

FIG. 3

FULL TEXT SEARCH

KEYWORD [ RETRIEVAL AND HISTORY ]

[EXECUTE SEARCH]

FULL TEXT SEARCH RESULT

SEARCH RESULT LIST

| DOCUMENT NO | TITLE | SELECTION |
|---|---|---|
| 821 | INFORMATION RETRIEVAL SYSTEM | ☑ |
| 1094 | INFORMATION RETRIEVAL APPARATUS | ☑ |
| 321 | HISTORY INFORMATION RETRIEVAL METHOD | ☐ |
| 10289 | MAP INFORMATION DISPLAY SYSTEM | ☐ |
| 3248 | OBSTACLE COUNTERMEASURE SUPPORT SYSTEM | ☐ |
| 21584 | HISTORY DATA PROCESSING SYSTEM | ☐ |
| 1989 | ACCESS HISTORY MANAGING SYSTEM | ☐ |

[ADD TO SELECTED DOCUMENT LIST]   [SELECT ALL]   [CANCEL ALL]

[END]

FIG. 6

DOCUMENT CONTENT REFERENCE - INFORMATION RETRIEVAL SYSTEM

☑ SELECT

TITLE: INFORMATION RETRIEVAL SYSTEM
AUTHOR: TARO NIPPON
SUMMARY:
BASED ON KNOWLEDGE EXPRESSION

AT THE BIGINNING
IN THE RETRIEVAL SYSTEM

[END]

| MAIN | | | |
|---|---|---|---|
| SELECTED DOCUMENT LIST | | | |
| DOCUMENT NO | TITLE | | SELECTION |
| 821 | INFORMATION RETRIEVAL SYSTEM | | ☑ |
| 1094 | INFORMATION RETRIEVAL APPARATUS | | ☐ |
| | | | ☐ |
| | | | ☐ |
| | | | ☐ |
| | | | ☐ |
| | | | ☐ |

[ANALOGOUS DOCUMENT SEARCH] [EXCLUDE FROM LIST] [SELECT ALL] [CANCEL ALL]
[FULL TEXT SEARCH] [END]

FIG. 7

ANALOGOUS DOCUMENT SEARCH RESULT

SEARCH RESULT LIST

| DOCUMENT NO | TITLE | NUMBER OF TIMES | SELECTION |
|---|---|---|---|
| 321 | HISTORY INFORMATION RETRIEVAL SYSTEM | 1042 | ☑ |
| 1094 | INFORMATION RETRIEVAL APPARATUS | 859 | ☐ |
| 824 | COOPERATIVE FILTERING RETRIEVAL METHOD | 705 | ☑ |
| 20481 | RETRIEVAL CONDITION NARROWING METHOD | 200 | ☐ |
| 10432 | INTERACTIVE RETRIEVAL SYSTEM | 35 | ☑ |
| 4392 | KNOWLEDGE-BASED RETRIEVAL SYSTEM | 22 | ☑ |
| 2821 | INFORMATION RETRIEVAL SYSTEM | 20 | ☐ |

[ ADD TO SELECTED DOCUMENT LIST ]   [ SELECT ALL ]   [ CANCEL ALL ]

[ END ]

FIG. 8

MAIN

SELECTED DOCUMENT LIST

| DOCUMENT NO | TITLE | SELECTION |
|---|---|---|
| 821 | INFORMATION RETRIEVAL SYSTEM | ☑ |
| 1094 | INFORMATION RETRIEVAL APPARATUS | ☑ |
| 321 | HISTORY INFORMATION RETRIEVAL METHOD | ☑ |
| 824 | COOPERATIVE FILTERING RETRIEVAL METHOD | ☑ |
| 10432 | INTERACTIVE RETRIEVAL SYSTEM | ☑ |
| 4392 | KNOWLEDGE-BASED RETRIEVAL SYSTEM | ☑ |
|  |  | ☐ |

[ ANALOGOUS DOCUMENT SEARCH ]   [ EXCLUDE FROM LIST ]   [ SELECT ALL ]   [ CANCEL ALL ]

[ FULL TEXT SEARCH ]   [ END ]

FIG. 9

| DOCUMENT ID | INDEX INFORMATION | TITLE | DOCUMENT BODY URL |
|---|---|---|---|
| 321 | index1, ... ,indexN | HISTORY INFORMATION RETRIEVAL METHOD | file://doc/doc321.xml |
| 10981 | index1, ... ,indexM | ELECTRONIC COMMERCE SYSTEM | file://doc/doc10981.xml |

FIG. 11

| FILE NAME | BODY |
|---|---|
| file://doc/doc321.xml | \<body\>..............................................................\</body\> |
| file://doc/doc10981.xml | \<body\>..............................................................\</body\> |

FIG. 12

| DOCUMENT ID | TITLE | DOCUMENT BODY URL |
|---|---|---|
| 821 | INFORMATION RETRIEVAL SYSTEM | file://doc/doc821.xml |
| 1094 | INFORMATION RETRIEVAL APPARATUS | file://doc/doc1094.xml |

FIG. 13

| SELECTION ID | DOCUMENT ID |
|---|---|
| XX | 321 |
| XX | 821 |
| XX | 1094 |
| YY | 321 |
| YY | 821 |
| YY | 1094 |
| YY | 1095 |
| YY | 1096 |

} XX-TH SELECTION HISTORY (rows 1–3)
} YY-TH SELECTION HISTORY (rows 4–8)

FIG. 15

| DOCUMENT ID | TITLE | DOCUMENT BODY URL | NUMBER OF TIMES OF SELECTION |
|---|---|---|---|
| 321 | HISTORY INFORMATION RETRIEVAL METHOD | file://doc/doc321.xml | 1042 |
| 824 | COOPERATIVE FILTERING RETRIEVAL METHOD | file://doc/doc824.xml | 705 |
| ⋮ | ⋮ | ⋮ | ⋮ |

FIG. 16

| DOCUMENT ID | TITLE | DOCUMENT BODY URL |
|---|---|---|
| 821 | INFORMATION RETRIEVAL METHOD | file://doc/doc821.xml |
| 1094 | INFORMATION RETRIEVAL APPARATUS | file://doc/doc1094.xml |
| 321 | HISTORY INFORMATION RETRIEVAL SYSTEM | file://doc/doc321.xml |
| 824 | COOPERATIVE FILTERING RETRIEVAL METHOD | file://doc/doc824.xml |
| ⋮ | ⋮ | ⋮ |

FIG. 17

| KEYWORD SET ID | KEYWORD | NUMBER OF TIMES OF SELECTION |
|---|---|---|
| KS1 | KWDa | 1 |
| KS1 | KWDb | 2 |
| KS1 | KWDc | 1 |

(a) KEYWORD AND NUMBER OF TIMES OF SELECTION INCLUDED PER KEYWORD SET

| KEYWORD SET ID | DOCUMENT SET ID |
|---|---|
| KS1 | 1 |
| KS1 | 2 |
| KS1 | 3 |

(b) SELECTED DOCUMENT SET ID INCLUDED PER KEYWORD SET (IN CASE OF SELECTION RESULTS 1 TO 5 BELONGING TO THE SAME KEYWORD SET KS1)

| DOCUMENT SET ID | DOCUMENT ID | NUMBER OF TIMES OF SELECTION |
|---|---|---|
| 1 | DOC1 | 1 |
| 1 | DOC2 | 2 |
| 1 | DOC3 | 1 |
| 1 | DOC4 | 2 |
| 1 | DOC5 | 1 |
| 2 | DOC5 | 1 |
| 2 | DOC6 | 2 |
| 2 | DOC7 | 1 |
| 2 | DOC8 | 2 |
| 2 | DOC9 | 2 |
| 3 | DOC9 | 1 |
| 3 | DOC10 | 2 |
| 3 | DOC11 | 2 |

(c) DOCUMENT ID AND NUMBER OF TIMES OF SELECTION INCLUDED IN SELECTED DOCUMENT SET

FIG. 20

SYSTEM AND METHOD FOR DETERMINING NUMERICAL REPRESENTATIONS FOR CATEGORICAL DATA FIELDS AND DATA PROCESSING SYSTEM

PRIORITY CLAIM

The present application claims the priority of Japanese patent application, Serial No. 2002-46934, titled "Retrieval System, System, Terminal and Retrieval Method," which was filed on Feb. 22, 2002, and which is incorporated herein by reference.

FIELD OF THE INVENTION

The present invention relates to a retrieval system that can efficiently extract target information in a search through a database using keywords or phrases.

BACKGROUND OF THE INVENTION

In recent years, many computer apparatuses have been used while being connected to a network such as the Internet, a company network or a LAN (Local Area Network). The network includes a server connected as a computer apparatus for offering services, and various information is stored in the server. By connecting a computer apparatus as a terminal to the server via the network, a user can obtain various information therefrom.

For a user to acquire information, processing is required to extract target information from a large amount of stored information. In one method, for example, a user designates a keyword that may be included in target information. Data including that keyword is extracted from a large amount of stored information. In such extraction processing, a program called a retrieval engine has been widely used. The retrieval engine widely searches through information stored in a server and automatically extracts data that includes a keyword designated by a user.

However, it is not necessarily true that all the data obtained using such a retrieval engine are target information a user wishes to find. For example, a user wishes to obtain information about "OLE for Process Control", often represented by an abbreviation "OPC". If a retrieval is carried out using the full expression "OLE for Process Control" as a keyword, information expressed as "OPC" can not be acquired. In view of this limitation, using a retrieval implemented by including "OPC" as a keyword in an "OR" connection, will enable all the data including "OPC" to be extracted.

However, "OPC" is also an abbreviation of "Organic Photo Conductor". Consequently, the retrieval engine extracts not only those data about "OLE for Process Control" the user wishes to find, but also those data about "Organic Photo Conductor" that are totally irrelevant. Therefore, the user has to select desired data individually from the extracted data. In this event, as the amount of the extracted data increases, searching for target data requires more time and more labor.

To exclude the totally irrelevant data about "Organic Photo Conductor", a new keyword relating to "OLE for Process Control", such as "control", can be added in an "AND" connection with "OPC", thereby focusing the extracted data on the desired topic. However, if this processing is carried out, those data about "OLE for Process Control" including "OPC" but not including the word "control" can not be extracted. Consequently, even those data actually relating to "OLE for Process Control" which should be extracted are excluded. Accordingly, there arises a problem that when retrieval is configured to exclude unnecessary data as described above, necessary data may also be excluded, thus failing to obtain target data.

What is needed is a retrieval system that can more accurately extract the information required by the user. The need for such a system has heretofore remained unsatisfied.

SUMMARY OF THE INVENTION

The present invention satisfies this need, and provides a system, a computer program product, and associated method (collectively referred to herein as "the system" or "the present system") for providing a retrieval system comprising a server for executing retrieval processing relative to previously stored documents, and at least one terminal for requesting retrieval processing relative to the server. The terminal receives a designation by a user relative to a given document shown in a search result, and requests an extended search to the server based on the document designated by the user.

The server receives a request for the extended search and extracts a group to which the designated document belongs, from a plurality of groups. Each of these groups includes at least one document concurrently selected in past retrieval processing made by the user, another user, or both users. The server then outputs a document belonging to the extracted group as an extended search result. In this retrieval system, the target document can be extracted by conducting a search utilizing the past retrieval processing.

The terminal transmits to the server a selection performed by the user relative to documents included in the retrieval result or the extended retrieval result. The server then produces a new group based on the selection and stores the new group as a selection history.

The terminal requests the server to perform a preparation search based on a search term before requesting the extended search. The designated document is a document selected from a result of the preparation search. In this case, the server stores as a selection history the search term used in the preparation search along with the retrieval result.

The present system can also be implemented on a computer system, such as a server. According to the present system, there is provided a system for performing retrieval processing for an object in response to a request from a user. This system comprises the following components:

A selection history storing means for storing as selection history data objects simultaneously selected by the user, another user or multiple users in past retrieval processing;

A reception means for receiving an extended search request based on an object designated by the user for an extended search;

A judging means for judging whether history data of the designated object is stored in the selection history storing means; and An object identifying means for identifying one or more objects selected simultaneously with the designated object from the retrieval result stored in the selection history storing means if the judging means determines that the history data of the designated object is stored in the selection history storing means.

The system further comprises an object database for storing objects and an object extracting means for extracting from the object database one or more objects identified by the object identifying means.

The system further comprises a selection frequency storing means for storing data about the number of times an object has be selected in the past.

Further, the present system can also be understood as a terminal. According to the present system, there is provided a terminal connected to a server via a network that is capable of extracting a target object from the server.

The terminal comprises the following components: an input means for receiving a search command from a user; a transmitting/receiving means for transmitting a request for a search to the server based on the search command and receiving a result of the search; and a display means for displaying an input from the user and data transmitted from the server, wherein the display means displays both a selecting means and a reception means. The selection means allows selection of a desired object from objects shown in the result of the search received from the server. The reception means allows reception of a command for an analogous search with respect to the selected object.

In addition to the result of the analogous search, the display means displays an analogous object selecting means for allowing selection of an analogous object included in the result.

In addition to an object that is analogous to the selected object, the display means displays the number of times the analogous object was selected in the past as a result of the analogous search.

Further, the present system can also be understood as a retrieval method. According to the present system, there is provided a retrieval method for conducting a search for a target document from a database. The retrieval method comprises the following steps: conducting a first search based on a given term in response to a request from a user; receiving selection of a given document relative to a result of the first search; and conducting a second search based on the selected given document, wherein, in the second search, if the given document was extracted in past retrieval processing made by the user, another user or multiple users, a document having a history of being selected simultaneously with the given document is extracted (i.e., associated document). Alternatively, the retrieval method determines a frequency of co-occurrence between the selected document and associated documents; identifies an associated document that has a frequency of co-occurrence exceeding a predetermined threshold; designates this associated document as the target document; and then extracts it.

The retrieval method further comprises a step of storing, as a new search result, a document simultaneously selected by the user with respect to the document extracted in the second search.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 3 is a diagram showing a main window that is displayed on a display section of the user terminal of the retrieval service offering system of FIG. 1;

FIG. 4 is a diagram showing a window for inputting a keyword in the user terminal of the retrieval service offering system of FIG. 1;

FIG. 5 is a diagram showing a window of full text search result displayed on the display section of the user terminal of the retrieval service offering system of FIG. 1;

FIG. 6 is a diagram showing a window displaying the body of document data retrieved by the retrieval service offering system of FIG. 1;

FIG. 7 is a diagram showing a main window that is displayed on the display section of the user terminal of the retrieval service offering system of FIG. 1;

FIG. 8 is a diagram showing a window of analogous document search result displayed on the display section of the retrieval service offering system of FIG. 1;

FIG. 9 is a diagram showing a main window that is displayed on the display section of the user terminal of the retrieval service offering system of FIG. 1;

FIG. 11 is a diagram showing one example of data stored in an index data storing section of a document database of the retrieval service offering system of FIG. 1;

FIG. 12 is a diagram showing one example of data stored in a body data storing section of the document database of the retrieval service offering system of FIG. 1;

FIG. 13 is a diagram showing one example of data stored in a full text search result storing section of the retrieval service offering system of FIG. 1;

FIG. 15 is a diagram showing one example of selection history data stored in a selection history data storing section of a history database of the retrieval service offering system of FIG. 1;

FIG. 16 is a diagram showing one example of data stored in an analogous document search result storing section of the retrieval service offering system of FIG. 1;

FIG. 17 is a diagram showing one example of data stored in a selection result storing section of the retrieval service offering system of FIG. 1;

FIG. 20 is a diagram showing a storage example of data obtained as a result of intensive processing shown in FIG. 19.

DETAILED DESCRIPTION OF PREFERRED EMBODIMENTS

The following definitions and explanations provide background information pertaining to the technical field of the present invention, and are intended to facilitate the understanding of the present invention without limiting its scope:

Web browser: A software program that allows users to request and read hypertext documents. The browser gives some means of viewing the contents of Web documents and of navigating from one document to another.

Internet: A collection of interconnected public and private computer networks that are linked together with routers by a set of standards protocols to form a global, distributed network.

Figure 1:
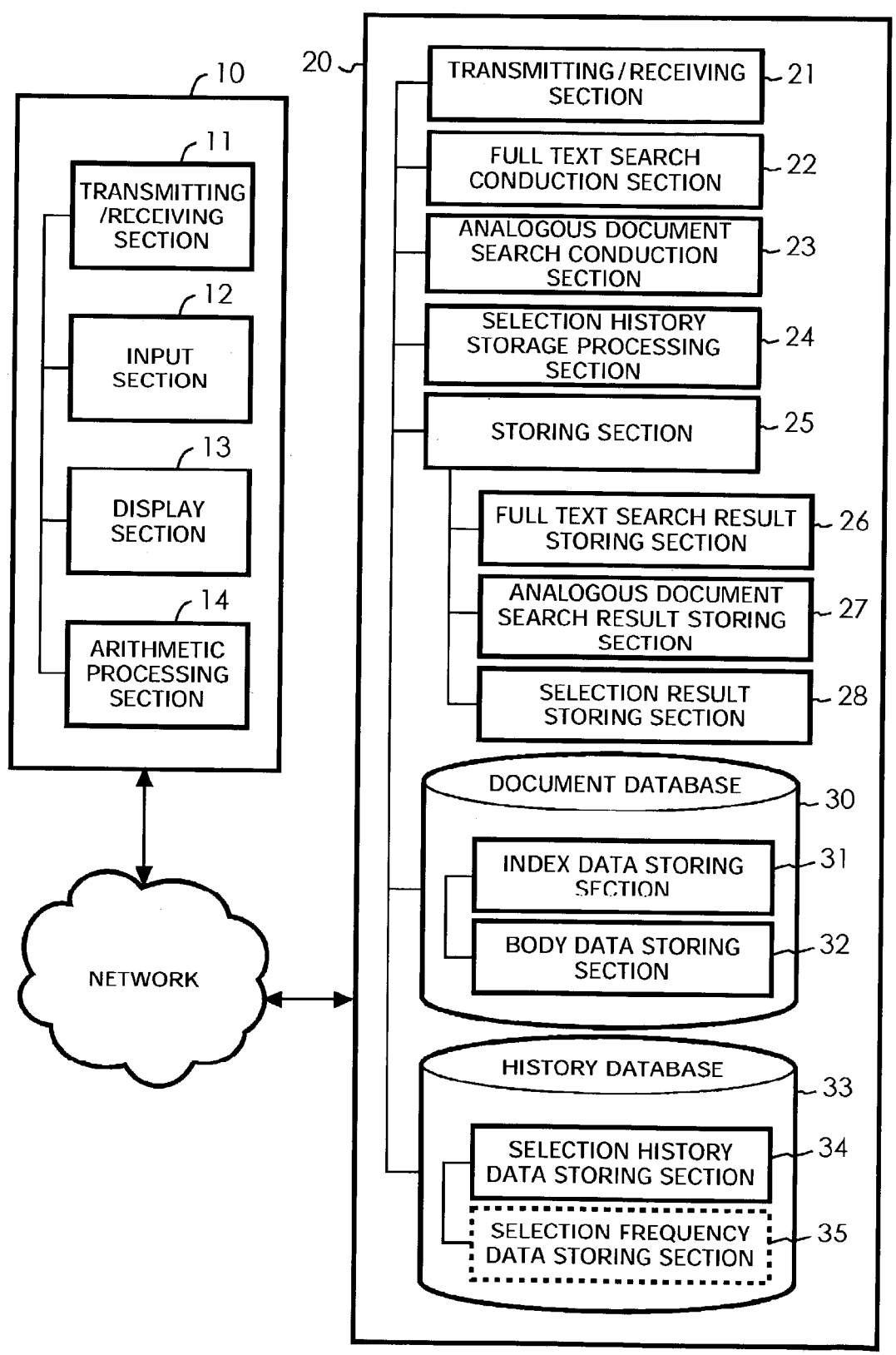
FIG. 1 is a schematic illustration of an exemplary operating environment in which a retrieval service offering system according to a preferred embodiment of the present invention can be used.

FIG. 1 portrays an exemplary overall environment in which a system and associated method for a retrieval service offering system according to the present invention may be used. The retrieval service offering system (retrieval system) comprises a user terminal 10 that is used by a user in processing of retrieving target documents (objects) through a search, and a server 20 that stores document data and conducts a search therethrough. The user terminal 10 and the server 20 are connected to each other via a network such as the Internet. The retrieval system includes a software programming code or computer program product that is typically embedded within, or installed on a computer. Alternatively, the retrieval system can be saved on a suitable storage medium such as a diskette, a CD, a hard drive, or like devices.

The user terminal 10 comprises the following components: a transmitting/receiving section 11 for performing transmission/reception of data via the network; an input section 12 such as a keyboard or a mouse for receiving an input from the user; a display section 13 such as a display unit for displaying outputted data; and an arithmetic processing section 14 comprising a CPU and so forth.

The server 20 comprises the following components: a transmitting/receiving section 21 for performing transmission/reception of data via the network; a full text search conducting section 22 for conducting a search through all documents; an analogous document search conducting section 23 for conducting a search through analogous documents; a selection history storage processing section 24; a storing section 25 composed of a memory for temporarily storing data and so forth; a document database 30 storing data of documents; and a history database 33 storing data of search histories.

Assuming there is a document X selected by a user A, the "analogous document" of the document X represents a document that has been selected along with the document X in past retrieval processing by a user such as user A or users other than the user A. Documents simultaneously selected in one retrieval processing are considered highly relevant to each other, consequently they are considered "analogous documents." Alternatively, the retrieval method determines a frequency of co-occurrence between the selected document and associated documents; identifies an associated document that has a frequency of co-occurrence exceeding a predetermined threshold; designates this associated document as the target document; and then extracts it.

In the server 20, the storing section 25 comprises the following components: a full text search result storing section 26 that temporarily stores full text search results; an analogous document search result storing section 27 that temporarily stores analogous document search results; and a selection result storing section 28 that temporarily stores documents selected by a user. The document database 30 comprises an index data storing section 31 storing index data that prepares for facilitating a search through the document data. In addition, the document database 30 comprises a body data storing section 32 that stores the document data themselves. The history database 33 comprises a selection history data storing section 34 that stores history data of document data selected by users. If necessary, a selection frequency data storing section 35 may also be provided for storing data relating to the number of times a document has been selected with respect to a specified or designated document.

In the retrieval service offering system shown in FIG. 1, document data a user requests can be retrieved easily and accurately by performing a full text search (primary search, preparation search) and then performing an analogous document search (secondary search, extended search).

Figure 2:
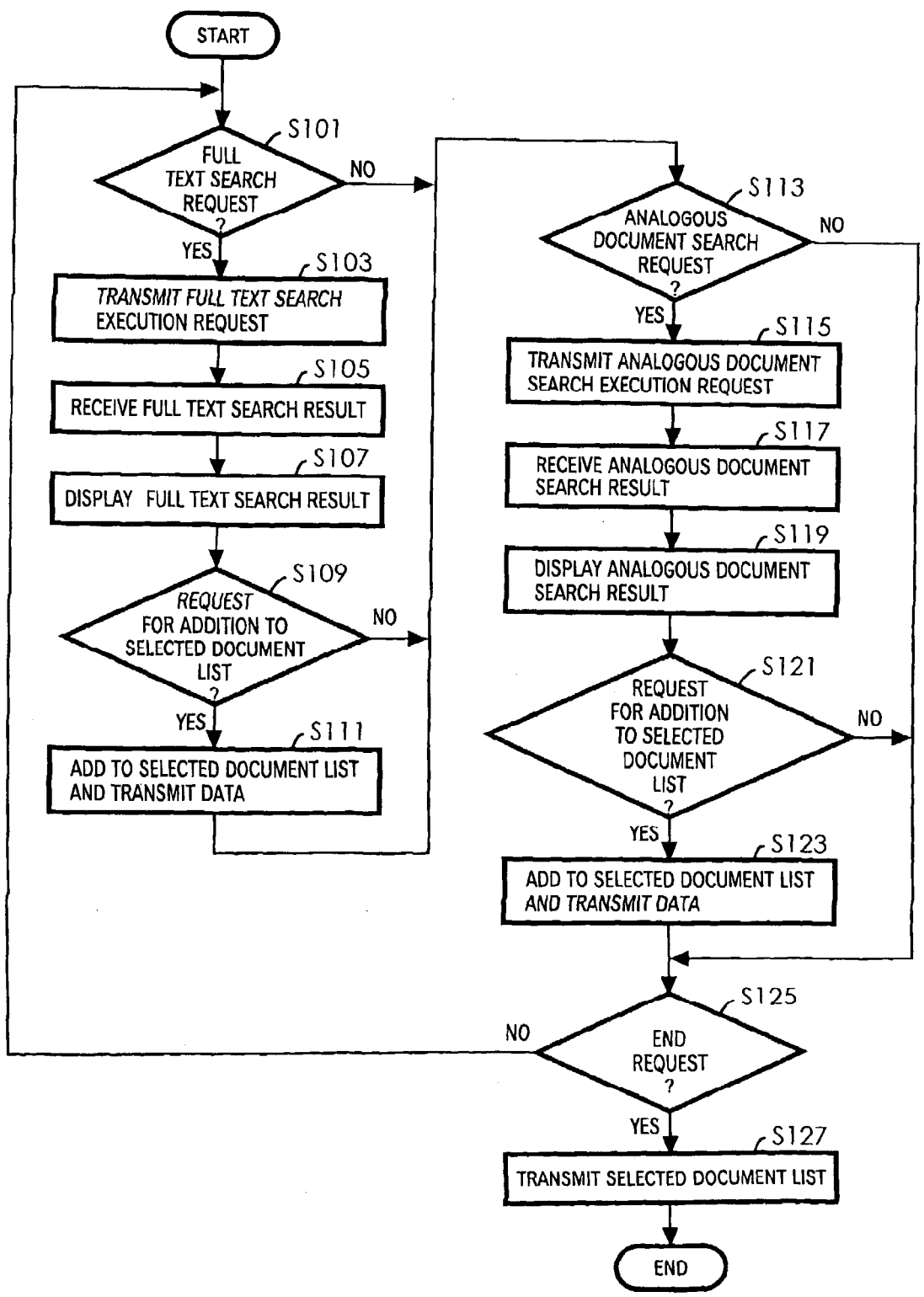
FIG. 2 is a process flow chart illustrating a method of operation in a user terminal of the retrieval service offering system of FIG. 1.

FIG. 2 is a process flow diagram illustrating the method of operation of the user terminal 10. FIG. 3 is a diagram showing a main window displayed on the display section 13 of the user terminal 10.

First, the user terminal 10 determines whether there is a request for a full text search by a user via the input section 12 (step S101). Specifically, when a "full text search" button 50 shown in FIG. 3 is selected by the user, the user terminal 10 determines that a full text search request has been made, and displays a window for inputting a keyword on the display section 13 as shown in FIG. 4. The user inputs within a keyword-input frame one or more keywords that are expected to be included in information the user wishes to obtain. In the keyword input frame shown in FIG. 4, "retrieval" and "history" are linked together with "AND". In this case, document data including both keywords of "retrieval" and "history" is extracted by the retrieval system.

If the retrieval system determines at step S101 that the full text search request has been made, the user terminal 10 transmits a full text search execution request to the server 20 via the transmitting/receiving section 11 (step 103). This full text search execution request asks the server 20 to conduct a full text search. In addition, the user terminal 10 simultaneously transmits the keywords inputted by the user within the keyword-input frame shown in FIG. 4. The user terminal 10 then receives at the transmitting/receiving section 11 a full text search result that was transmitted from the server 20 via the network in response to such a full text search execution request (step S105).

Subsequently, the user terminal 10 displays the received full text search result on the display section 13 (step S107). FIG. 5 is a diagram illustrating a window of the full text search result displayed on the display section 13. As shown in FIG. 5 in the full text search result window, a selection button (selecting section) 51 is displayed per extracted document data, thereby allowing the user to select given document data. Upon selection, the user can select given document data based on titles displayed on the window; selection is also possible by referring to the body of the document data. Specifically, by selecting one of the titles (e.g. by clicking one of the underlined titles using a mouse connected to the input section 12), the body 52 of the document data as shown in FIG. 6 can be displayed. As shown in FIG. 6, a selection button 53 for selecting the desired document data can also be displayed in a window displaying the body 52.

The user terminal 10 determines at step S109 whether there is a request for adding the document data for which the selection button 53 was checked as described above. Specifically, the user terminal 10 determines based on whether an "add to selected document list" button 54 was selected by the user in the full text search result window shown in FIG. 5. If the user terminal 10 determines that there is such a request, the user terminal 10 adds the selected documents to the selected document list, and further transmits data of the selected document list to the server 20 (step S111). In this event, a list of the documents selected at the selection buttons 51 for the full text search result shown in FIG. 5 is displayed in a main window as shown in FIG. 7. If the user terminal 10 determines at step S109 that there is no request for addition to the selected document list, step S113 is executed.

If at step S101 the user terminal 10 determines that a full text search request has not been requested, the user terminal 10 proceeds to step S113. The user terminal 10 then determines whether there is an analogous document search request (step S113). First, in the document list displayed in the main window shown in FIG. 7, the user selects a document that will be a basis for an analogous document search by checking a corresponding selection button 51. When an "analogous document search" button 55 in the main window shown in FIG. 7 is selected after a given document is selected in the main window as noted above, the user terminal 10 determines that the analogous document search request has been made.

If at step S113 the user terminal 10 determines that the analogous document search has been requested, the user terminal 10 transmits an analogous document search execution request to the server 20 via the transmitting/receiving section 11 (step S115). In addition, the user terminal 10 simultaneously transmits such data designating the selected document that will be the basis for an analogous document search. The user terminal 10 then receives at the transmitting/receiving section 11 an analogous document search result that is transmitted from the server 20 via the network in response to the analogous document search execution request (step S117).

As used herein, "analogous document search result" represents a document group that is extracted when a document selected with respect to a full text search result has been selected in another past search. Specifically, it represents a document group obtained in another search that includes a document selected this time and documents selected simultaneously with such a document. Further details will be given in later description of processing implemented in the server 20.

It is to be noted that a plurality of documents in the list of FIG. 7 may be selected for the analogous document search. In this case, a document group that includes all the selected documents may be extracted (AND extraction), or document groups each of which includes one of the selected documents may be extracted (OR extraction). A user can select either the AND extraction or the OR extraction upon requesting an analogous document search.

Subsequently, the user terminal 10 displays the received analogous document search result on the display section 13 (step S119). FIG. 8 is a diagram showing an analogous document search result window that is displayed on the display section 13. As shown in FIG. 8, a selection button 56 is displayed for each document in the analogous document search result window in a manner similar to the full text search result window shown in FIG. 5. In this case, it is possible to distinguish a document that has already been selected by either coloring it or giving it a check disabling input attribute.

Furthermore, as identified by a reference symbol 57, the frequency representing the number of times a document has been previously selected is displayed per document. As the number of times of selection of a document in the past increases, the significance of the document increases. Consequently, the user can select a proper document from the analogous document search result by referring to not only the title or body of the document, but also the number of times the document has previously been selected with respect to a specific document.

The user terminal 10 determines whether there is a request for addition to the selected document list with respect to a list on which the selection buttons 56 are checked as noted above (step S121). If is the user terminal 10 determines that the addition request has been made, the user terminal 10 adds the selected documents to the selected document list and further transmits the selected document list to the server 20 (step S123). In this event, a list of the documents selected via the selection buttons 56 for the analogous document search result shown in FIG. 8 is displayed in a main window as shown in FIG. 9.

If at step S121 the user terminal 10 determines that there is no request for addition to the selected document list, the user terminal 10 proceeds to step S125. Similarly, if the user terminal 10 determines at step S113 that there is no analogous document search request, the user terminal 10 proceeds to step S125

The user terminal 10 determines whether there is an end request at step S125. The user terminal 10 determines based on whether an "end" button 58 displayed in the main window shown in FIG. 9 has been selected by the user. If the user terminal 10 determines that there is no end request, the user terminal 10 returns to step S101 to repeat steps S101 through 123. If at step S123 the user terminal 10 determines that the end request has been made, the user terminal 10 transmits to the server 20 a selected document list designating the documents selected on the document list shown in FIG. 9 (step S127) and terminates the processing. When the end request has been made as noted above, the user can later use the resulting list selected by the user. Specifically, it is possible to store the selected list in the user terminal 10 for future reference by the user. Further, the user can use such a list in other applications such as an electronic mail. In addition, It may configured that only the document with a selection mark is included in the selected document list.

Figure 10:
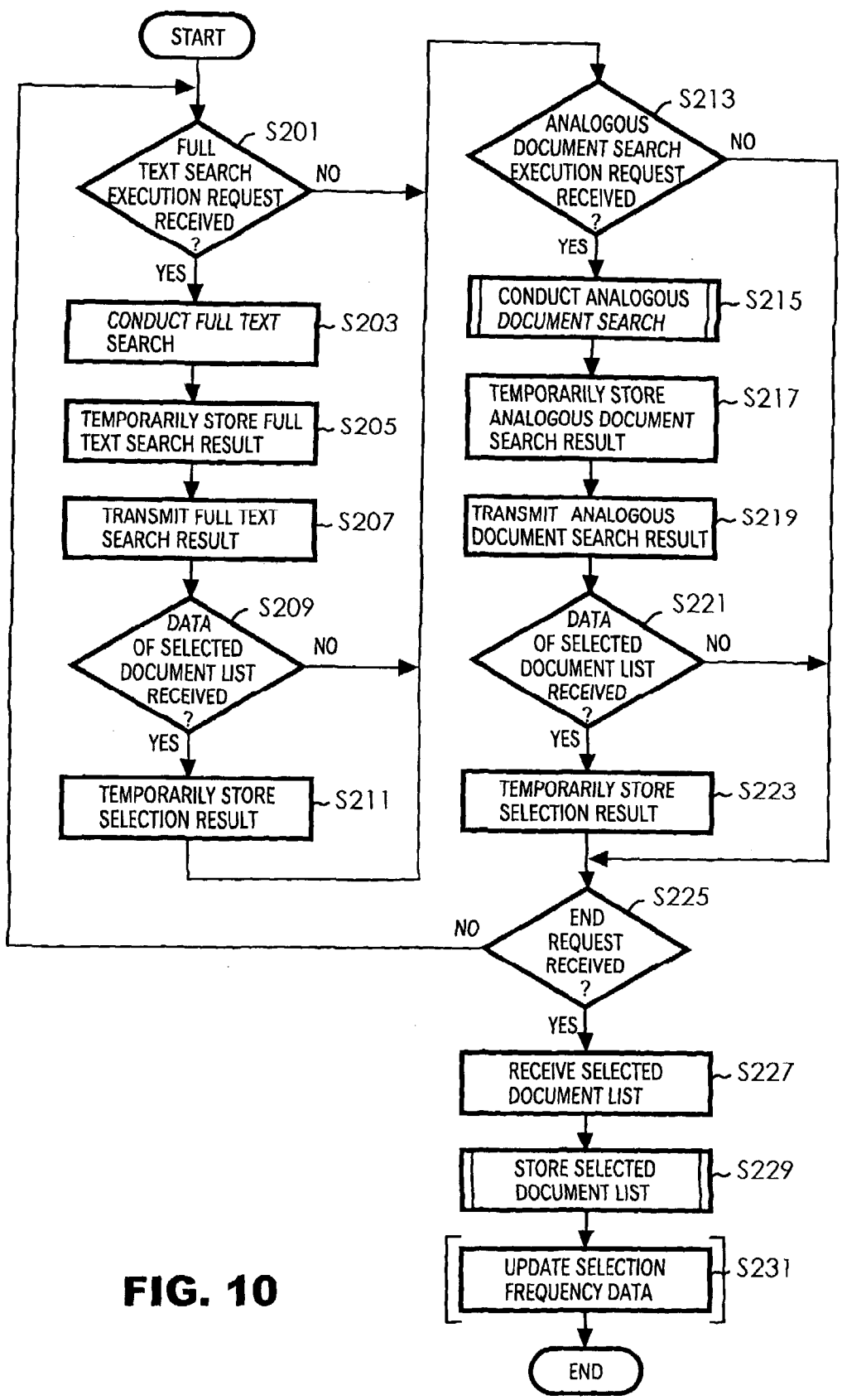
FIG. 10 is a diagram showing the flow of processing in a server of the retrieval service offering system of FIG. 1.

The flow of processing in the server 20 is illustrated by the diagram of FIG. 10. First, the server 20 determines whether the full text search execution request sent from the user terminal 10 has been received via the transmitting/receiving section 21 (step S201). If server 20 determines that the full text search execution request has been received, the server 20 performs a full text search in the full text search conducting section 22 based on the keywords that were provided with the full text search execution request (step S203).

FIG. 11 is a diagram showing one example of data stored in the index data storing section 31 of the document database 30. In the full text search at step S203, the full text search conducting section 22 extracts a document whose index information shown in FIG. 11 includes the keywords designated for the search in the index data storing section 31. An extracted full text search result is then temporarily stored in the full text search result storing section 26 of the storing section 25 (step S205). FIG. 13 shows one example of data stored in the full text search result storing section 26. Subsequently, the server 20 transmits the full text search result to the user terminal 10 via the transmitting/receiving section 21 (step S207).

With respect to the transmitted full text search result, there are those instances where a read request for the body of the given document is transmitted from the user terminal 10. In this event, the server 20 extracts the body data of the designated document from the body data storing section 32 of the document database 30 and transmits it to the user terminal 10. Specifically, the body data of a corresponding file name is extracted from those data stored in the body data storing section 32 as shown in FIG. 12. The body read request is satisfied also in the following processing at any time upon every occurrence of such a request.

Subsequently, the server 20 determines whether the data of the selected document list sent from the user terminal 10 has been received (step S209). If the server 20 determines that the data of the selected document list has been received, the server 20 temporarily stores as a selection request the data of the selected document list in the selection result storing section 28 of the storing section 25 (step S211).

If at step S209 the server 20 determines that the data of the selected document list have not been received, the server 20 proceeds to step S213. Similarly, if the server 20 at step S201 determines that the full text search execution request has not been received, the server 20 proceeds to step S213.

At step 213, the server 20 determines whether the analogous document search execution request sent from the user terminal 10 has been received (step S213). If server 20 determines that the analogous document search execution request has been received, the server 20 conducts the analogous document search in the analogous document search conducting section 23 based on an identification number of the document (hereinafter referred to as "document ID") on the selected document list transmitted along with the analogous document search execution request (step S215).

Figure 14:
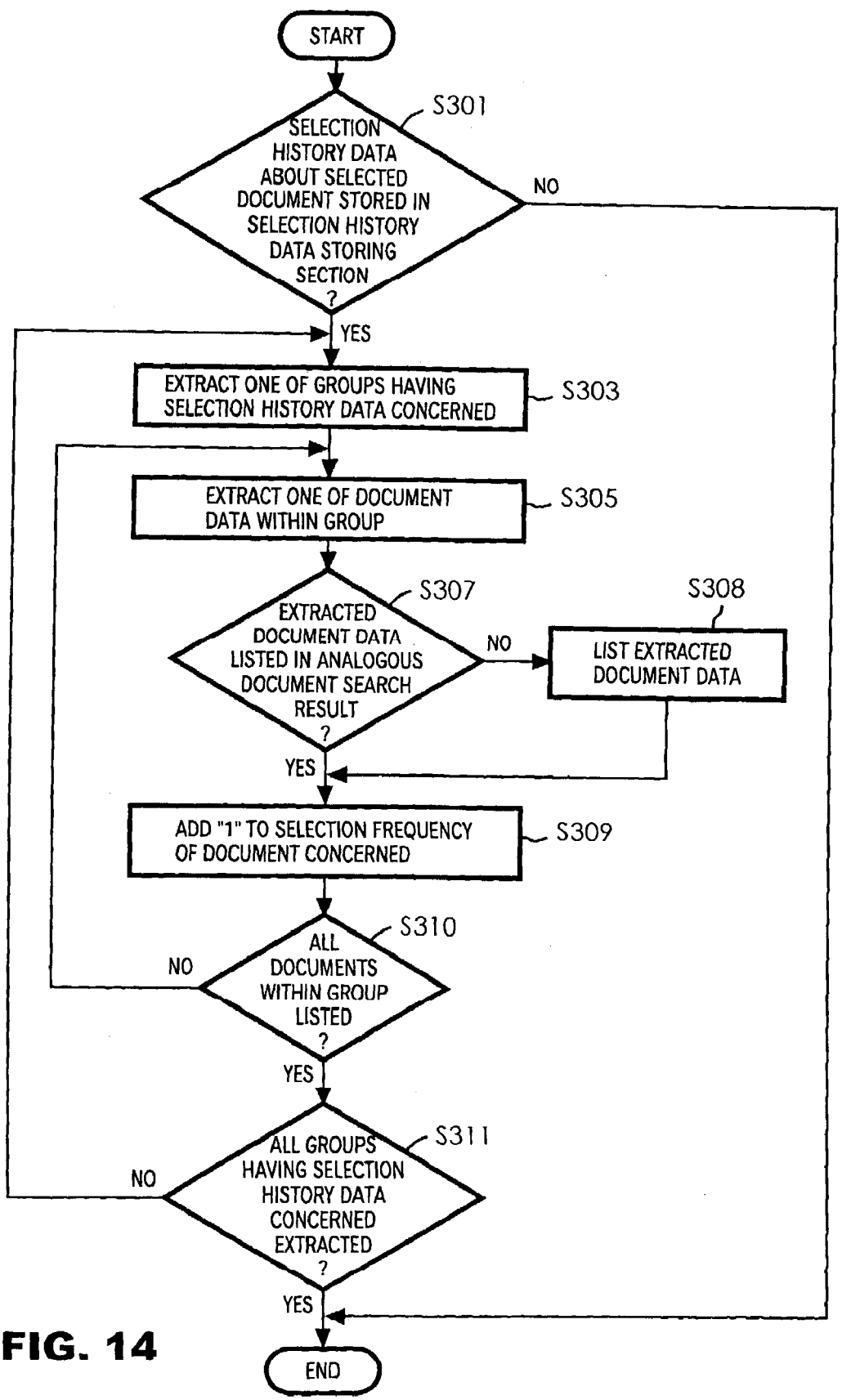
FIG. 14 is a diagram showing the flow of concrete processing in an analogous document search of the retrieval service offering system of FIG. 1.

The analogous document search of step S215 is described in detail in the process flow diagram of FIG. 14. First, the analogous document search conducting section 23 of the server 20 determines whether selection history data about the document selected from the selected document list for the analogous document search (hereinafter this document will be referred to as "designated document") is stored in the selection history data storing section 34 of the history database 33 (step S301).

Specifically, the analogous document search conducting section 23 checks whether selection history data having a document ID identical to a document ID of the document selected by the user in the main window shown in FIG. 7 exists in the selection history data storing section 34 of the history database 33. If such a document exists, server 20 extracts such data having the identical document ID.

FIG. 15 is a diagram showing one example of selection history data stored in the selection history data storing section 34 of the history database 33. For example, if the selection was performed as shown in FIG. 7, selection history data about document ID=821 whose selection button 51 is checked is found from selection history data stored in the selection history data storing section 34 as shown in FIG. 15.

As used herein, "selection history data" represents a group comprising documents finally selected for perusal by a user from the aggregate of documents obtained as a result of a search made by a user (not limited to the same user) in prior retrieval processing. For example, in FIG. 15 there are a plurality of documents whose selection ID is XX, wherein these documents were finally selected for perusal by a user simultaneously in the past XX-th search. Here, "documents finally selected for perusal" represent documents on a selected document list that is received as later described in step S227 of FIG. 10.

If the analogous document search conducting section 23 determines at step S301 that there is no selection history data about the designated document, the processing of the analogous document search shown in FIG. 14 is finished. On the other hand, if the analogous document search conducting section 23 determines that a selection history data about the designated document exists, the analogous document search conducting section 23 extracts one of document groups (each having the same selection ID) to which the selection history data about the designated document belongs (step S303).

For example, if the designated document is document ID=821 in FIG. 15, the document group whose selection ID is XX is extracted. Subsequently, selection history data of one of the documents in the document group is extracted (step S305). For example, if selection history data whose selection ID is XX is extracted as a document group in FIG. 15, selection history data of one of document ID=321, 821, 1094, for example, document ID=321, is extracted.

Subsequently, the analogous document search conducting section 23 determines whether the document of the selection history data extracted at step S305 has been listed in the analogous document search result (whether the document has been stored in the analogous document search result storing section 27)(step S307). If the analogous document search conducting section 23 determines that the document has not been listed, data about the document is stored in the analogous document search result storing section 27 so as to be listed (step S308).

After the document has been listed at step S308 or determined that it has been listed at step 307, the selection frequency data (see FIG. 16) of the extracted document is incremented by 1 (step S309). By implementing such a counting process, it is possible to show a document whose selection frequency is high in terms of the designated document as compared with the number of times a document has been simply selected.

Then, the analogous document search conducting section 23 determines whether all the documents within the document group extracted at step S303 have been listed (step S310). If the analogous document search conducting section 23 determines that there still remains a document within the extracted document group that has not been listed, the processing flow returns to step S305 to repeat steps S305 through S309 until all the documents within the document group have been listed.

If the analogous document search conducting section 23 determines at step S310 that all the documents within the extracted document group have been listed, the analogous document search conducting section 23 then determines whether or not all the document groups having the same document ID as that of the designated document have been extracted in the selection history data storing section 34 (step S311). For example, if the designated document is document ID=821, the selection history data shown in FIG. 15 include those data whose selection ID is YY in addition to the data whose selection ID is XX. If there exist a plurality of selection history data relative to one designated document as noted above, all the document groups having such selection history data are extracted.

If the analogous document search conducting section 23 determines at step S311 that not all the document groups have been extracted, the processing flow returns to step S303 to extract a next document group and repeat steps S303 through S310 until all the document groups having the same document ID as that of the designated document are extracted in the selection history data storing section 34. If the analogous document search conducting section 23 then determines at step S311 that all the document groups have been extracted, the processing of the analogous document search is finished.

After the analogous document search at step S215 in FIG. 10 has been conducted as described above, the server 20 temporarily stores the obtained analogous document search result in the analogous document search result storing section 27 of the storing section 25 (step S217). FIG. 16 shows one example of data stored in the analogous document search result storing section 27.

Subsequently, the server 20 transmits the analogous document search result to the user terminal 10 via the transmitting/receiving section 21 (step S219). In this event, the server 20 transmits, as the analogous document search result, the number of times of selection for each document along with selection history data. In this embodiment, as described above, the selection frequency data is updated in the course of the analogous document retrieval processing. On the other hand, it may also be configured that the number of times of selection in the past is individually calculated from the stored data of the history database 33 and the total number thereof is transmitted as selection frequency data.

Subsequently, the server 20 determines whether data of a selected document list in response to the analogous document search result has been received from the user terminal 10 (step S221). If the server 20 determines that the data of the selected document list has been received, the server 20 updates the selection result and temporarily stores it in the selection result storing section 28 of the storing section 25 (step S223). FIG. 17 shows one example of data stored in the selection result storing section 28.

If at step S221 the server 20 determines that the data of the selected document list have not been received, the server 20 proceeds to step S225. Similarly, if at step S213 server 20 determines that the analogous document search execution request has not been received, the server 20 proceeds to step S225.

The server 20 next determines whether the retrieval processing end request has been received from the user terminal 10 (step S225). If the server 20 determines that the end request has not been received, the processing flow returns to step S201 to continue the foregoing retrieval processing, repeating steps S201 to S223. For example, it is possible that the document is further selected from the list of the analogous document search result obtained as a result of implementing the analogous document search at step S215, and an analogous document search about the selected document is requested.

On the other hand, if the server 20 determines that the end request has been received, a selected document list is subsequently received from the user terminal 10 (step S227). The selected document list represents a list of documents finally selected for perusal by a user with respect to the result of the analogous document search (the full text search if the analogous document search is not performed), for example, those documents whose selection boxes are checked in FIG. 9.

Figure 18:
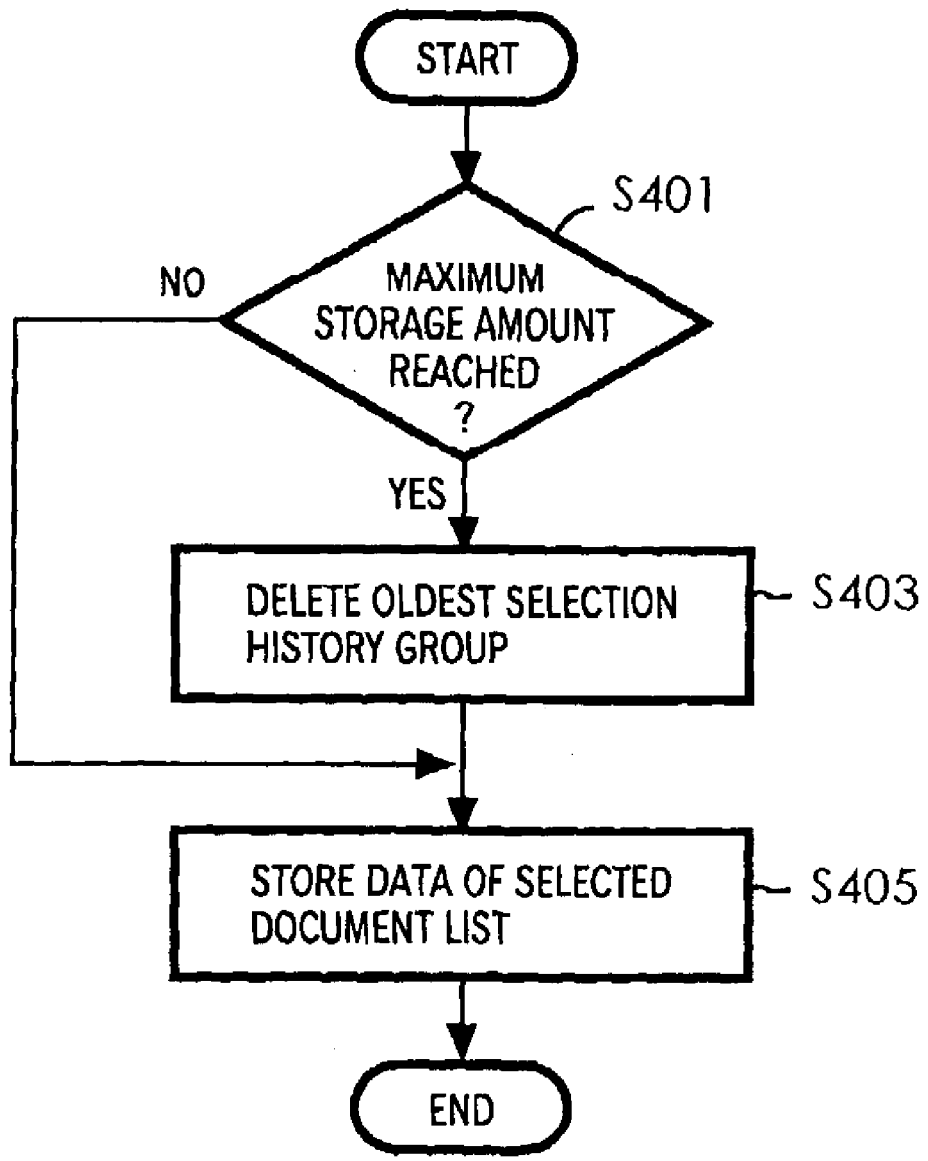
FIG. 18 is a diagram for explaining the flow of processing for storing a selected document list of the retrieval service offering system of FIG. 1.

The server 20 stores the selected document list received at step S227 in the selection history data storing section 34 of the history database 33 (step S229). Here, processing upon storing the selected document list will be described in more detail. FIG. 18 is a processing flow diagram for the process of storing the selected document list. First, the selection history storage processing section 24 of the server 20 determines whether the selection history data stored in the selection history data storing section 34 of the history database 33 has reached the maximum storage amount (step S401).

If the selection history storage processing section 24 determines at step S401 that the maximum storage amount has been reached, it deletes from among the selection history data stored in the selection history data storing section 34 data of a document group to which the oldest selection history data belongs (step S403). Then, after deleting the old data, the data of the selected document list, i.e. the data of document ID and selection ID, is stored in the selection history data storing section 34 (step S405), and the storage processing is finished.

If the selection history storage processing section 24 determines at step S401 that the maximum storage amount has not been reached, it proceeds directly to step S405 and stores the data of the selected document list in the selection history data storing section 34. On the other hand, if there is no limitation to the amount of data that can be stored in the selection history data storing section 34, it may be configured that the foregoing storage processing is not performed and all the selection history data are stored.

After storing the selected document list at step S229 in FIG. 10 as described above, the processing is finished. On the other hand, if the data about the selection frequency is stored collectively, data update processing is executed after step S229 (step S231). In this event, the data update processing increments by one the selection frequency data with respect to each of the documents selected on the selected document list, and so forth. The selection frequency data is incremented in the selection frequency storing section 35. When later-described intensive processing is performed in advance, step S231 becomes necessary.

As described above, according to this embodiment, a user selects a desired document or a document close to such a document in a full text search result obtained as a result of conducting a full text search, then an analogous document search is performed with respect to the selected document. In the analogous document search, it is possible to extract a document group that was finally selected in a past search made by another user. The document group is the aggregate of documents that could return the proper search result that has been extracted by another. Therefore, there is a high possibility that the document group including the documents another user desired is the aggregate of documents a current user desires. Consequently, the current user can acquire the target documents efficiently.

The search is normally performed using a given keyword such that the search result includes unnecessary documents along with those documents a user desires. However, in this embodiment, it is possible to offer other documents that were selected in the past in association with such a selected document in addition to a document selected upon an analogous document search.

Therefore, unnecessary documents can be excluded at high rate, such that, even if several documents are extracted in the full text search result, it is possible to offer those documents as the user desires, at high rate with simple processing. Further, it is possible to offer those documents that are difficult to extract in the normal search, those documents with low consultation frequency, those documents that can not be extracted in the full text search made by the user, and so forth.

In the foregoing embodiment, the processing of storing the selected document list as a document group at step S229 shown in FIG. 10 and the method of preparing a document group are not limited to the method shown in FIG. 18. For example, there is also a method wherein document groups are formed based on combinations of a plurality of keywords (hereinafter referred to as "keyword sets") that are used in searches.

Additional document group preparing methods are now described citing two specific examples: a method that utilizes a distance between keyword sets and a method that executes intensive processing in advance.

First, a method of deriving a distance between keyword sets will be described. It is assumed that there are two keyword sets $KS_1$, $KS_2$ that have keywords as shown below, respectively.

$KS_1=\{KWDa, KWDb, KWDc\}$ $KS_2=\{KWDb, KWDc, KWDd, KEDe, KWDf\}$

Inasmuch as there are six keywords KWDa to KWDf, it can be considered that points $KP_1$ and $KP_2$ exist on $KS_1$ and $KS_2$ coordinates, respectively, in the six-dimensional space.

Then, a distance D between the two points $KP_1$ and $KP_2$ is calculated. In order of KWDa to KWDf, "1" is set when there is a corresponding keyword, while "0" is set when there is no corresponding keyword, thereby converting to coordinate values. The results are given as follows.

$KP_1=(1,1,1,0,0,0)$ $KP_2=(0,1,1,1,1,1)$

Using these coordinates, the distance D is calculated.

$D^2=(KP_1-KP_2)^2$ $D^2=1^2+0^2+0^2+1^2+1^2+1^2$ $D^2=4=2^2$

It can be said that as a value of the distance D increases, the distance between the two points $KP_1$ and $KP_2$ increases (it is assumed here that the different keywords exist on the different space axes). From this distance, the similarity between a search using $KS_1$ as a keyword set and a search using $KS_2$ as a keyword can be determined. When comparing values of the distance D, the rate relative to the number of dimensions is considered, i.e. simple value comparison is not appropriate. For example, in the case of a value of the distance D being 2, it is considered that the commonality is zero in the four-dimensional space, while the commonality is 80% in the ten-dimensional space.

For further enhancing the accuracy in the search, it is desirable to take a synonym into account. In this case, the coordinate value of a keyword is not limited to "0" or "1", but may have a wider value depending on the similarity in meaning between synonyms. Further, there may be a word in keywords, such as "system", which is frequently used but is not so strong in terms of connection to a search object. In this case, it may be possible to give a low coordinate value to such a keyword.

The second document-preparing group is the method that implements the intensive processing in advance. It is assumed that there exist the following data as the past selection results.

Selection Result 1 {DOC1, DOC2, DOC3, DOC4}
Selection Result 2 {DOC 2, DOC4, DOC5}
Selection Result 3 {DOC5, DOC6, DOC7, DOC8, DOC9}
Selection Result 4 {DOC6, DOC8, DOC9}
Selection Result 5 {DOC9, DOC10, DOC11}

First, these data are classified based on the similarities of the selected documents. Here, classification is performed based on patterns of selection results rather than on the contents of the documents. Various methods can be adopted that are known statistical methods implementing proper classification based on data distribution and so forth. For example, the similarity between the selection results can be calculated based on the foregoing calculation for deriving the distance between the keyword sets. However, it is desirable to consider how to determine the proper number of groups, how to determine coordinates that serve as a reference for calculating a distance, how to process a large amount of data, and so forth.

The following selected document sets 1, 2 and 3 are obtained by assuming that the selection results with a distance D being 3 or smaller belong to the same group.

Selected Document Set 1:
(Selection Results 1+2)={DOC1(1), DOC2(2), DOC3(1), DOC4(2), DOC5(1)}
Selected Document Set 2:
(Selection Results 3+4)={DOC5(1), DOC6(2), DOC7(1), DOC8(2), DOC9(2)}
Selected Document Set 3:
(Selection Results 5)={DOC9(1), DOC10(1), DOC11(1)}

Here, j of DOCj represents a selected j-th document, and n of DOCj(n) represents that a document DOCj was selected n times. Such data-intensive processing may be executed every time the selection result is actually stored or performed as batch processing.

It is assumed that in the state where the intensive data thus obtained is stored, an analogous document search is conducted based on the following selected documents.

Designated Document: {DOC1, DOC5}

Accordingly, the selected document set including {DOC1, DOC5} is retrieved from the stored intensive data. In this example, the foregoing selected document set 1 is selected and the result is given as follows:

(Search Result):
{DOC1(1), DOC2(2), DOC3(1), DOC4(2), DOC5(1)}

A plurality of selected document sets may be retrieved. For example, it is assumed that an analogous document search is conducted based on the following designated document:

Designated Document: {DOC5}

In this case, the selected document sets 1 and 2 become retrieval objects and the result is given as follows:

(Search Result):
{DOC1(1), DOC2(2), DOC3(1), DOC4(2), DOC5(2) DOC6(2), DOC7(1), DOC8(2), DOC9(2)}

On the other hand, if DOC1 is additionally selected as a designated document in this state, the result is given as follows and thus more accurate narrowing can be achieved in the search:

(Search Result):
{DOC1(1), DOC2(2), DOC3(1), DOC4(2), DOC5(1)}

That is, the same search result can be obtained as that obtained when the foregoing DOC1 and DOC5 are designated from the beginning.

Figure 19:
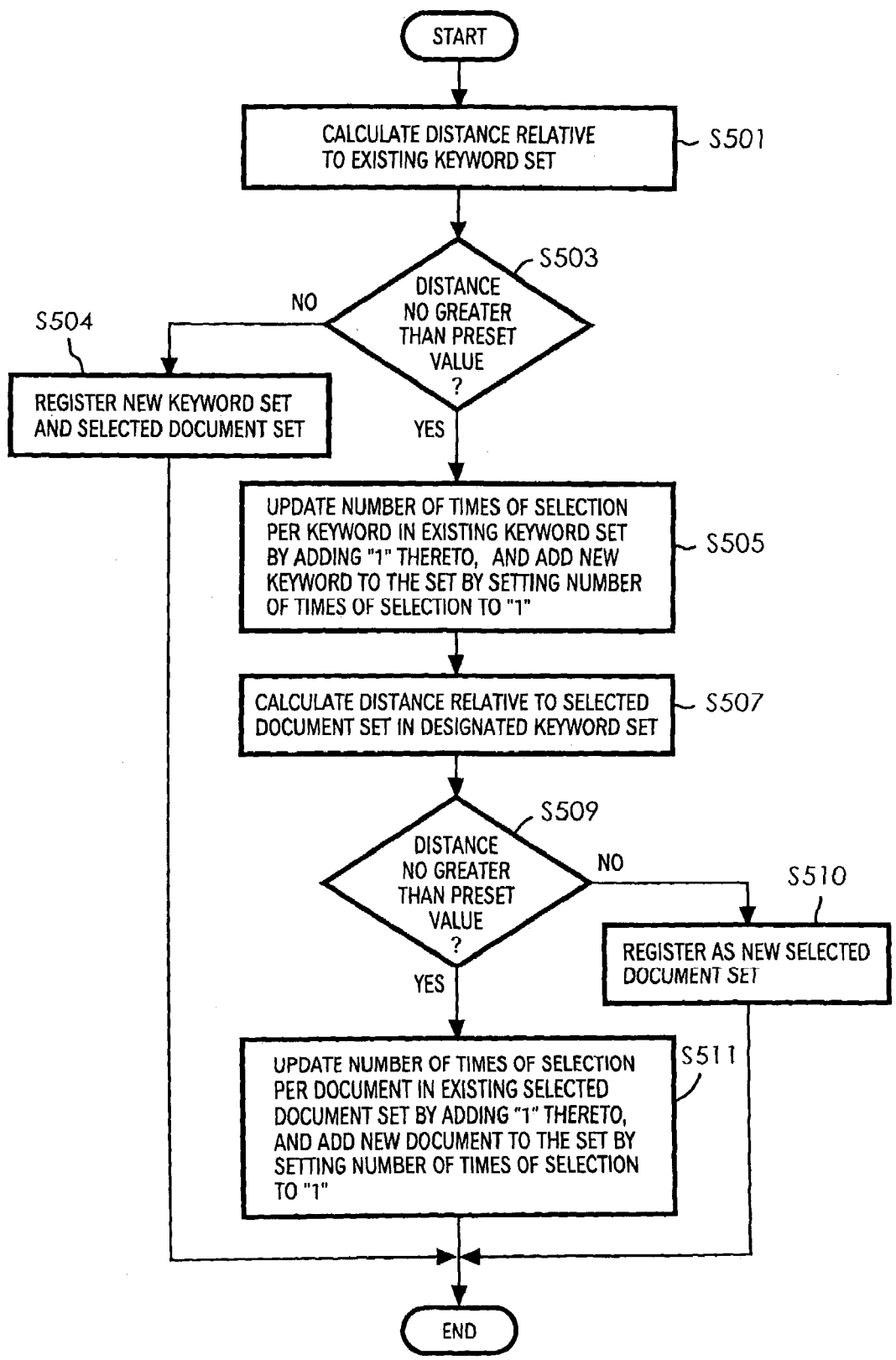
FIG. 19 is a diagram for explaining another example of the flow of processing for storing a selected document list of the retrieval service offering system of FIG. 1.

FIG. 19 shows the flow of processing for storing the selected document list using the keyword sets and the intensive processing as described above.

First, the server 20 calculates a distance D between a new keyword set generated as a result of a new search and a keyword set stored in the selection history data storing section 34 (step S501). The server 20 then determines whether the distance D is no greater than a preset value (step S503). This preset value can be properly set depending on the number of keywords, i.e. the number of dimensions.

If the server 20 determines at step S503 that the distance D is greater than the preset value, the new keyword set and the selected document list received at step S227 are stored in the selection history data storing section 34 (step S504). On the other hand, if the server 20 determines at step S503 that the distance D is no greater than the preset value, the server 20 updates the number of times of selection per keyword with respect to the keyword set stored in the selection history data storing section 34 (i.e. increasing the number of times of selection by one) and stores the new keyword by setting the number of times of selection to "1" (step S505).

Subsequently, a distance D' between a selected document group in the extracted keyword set and a selected document group in the new keyword set is calculated (step S507). The server 20 then determines whether the distance D' is no greater than a preset value (step S509). If the server 20 determines that the distance D' is greater than the preset value, the new selected document list is stored in the selection history data storing section 34 (step S510), and the processing is finished. On the other hand, if the server 20 determines that the distance D' is no greater than the preset value, the server 20 updates the number of times of selection per document stored in the selection history data storing section 34 (i.e. increasing the number of times of selection by one) and stores the new document by setting the number of times of selection to "1" (step S511) The server 20 then terminates the processing.

FIG. 20 shows a storage example of selection frequency data when the processing of FIG. 19 is executed in the foregoing example. In FIG. 20, after intensifying the keyword set, intensification by the selected document set in that keyword set is implemented. However, the intensification by the selected document set alone may be sufficient; the intensification of the keyword set may be omitted.

The analogous document search can be performed by extracting the past keyword set of which the distance D is small relative to the keyword set used in the search, so as to extract the documents selected in the extracted past keyword set. As described above, according to this embodiment, various methods can be adopted for the analogous document search such that the target documents can be extracted with high accuracy.

The retrieval processing in this embodiment is not limited to the foregoing methods. For example, in the retrieval processing in this embodiment, the full text search is conducted before the analogous document search. However, the retrieval method is not limited to this approach. For example, the full text search may be replaced with a search based on title, abstract or number. Further, by designating a given document in the beginning, the analogous document search can be performed from the start without implementing the preprocessing such as the full text search.

Further, the search in the user terminal 10 in this embodiment may be realized by a given program introduced into the user terminal 10, or realized on a web browser that displays data from the network such as the Internet.

Further, the program that executes the processing as described in this embodiment may also be in the form of a storage medium or a program transmitting apparatus as follows. Specifically, a program that causes a computer apparatus to execute the foregoing processing may be stored in a storage medium such as a CD-ROM, DVD, memory or hard disk, in a computer readable manner. On the other hand, the program transmitting apparatus may comprise storing means such as a CD-ROM, DVD, memory or hard disk storing the foregoing program, and transmitting means for reading the program from the storing means and transmitting the program to the side of an apparatus that executes the program, via a connector or a network such as the Internet or LAN.

Further, the window that is displayed to a user who makes a search is not limited to that shown in this embodiment wherein the window is switched per search. For example, the result of the analogous document search conducted relative to the result of the full text search may be displayed by highlighting or sorting the result of the full text search.

Further, in this embodiment, the selection of the document for preparing the selected document list is performed by the user checking the selection button. However, the selection method is not limited to this action or representation. For example, a document a user wishes to select may be put into a cart or the like. Further, it may also be configured that a document whose body or abstract is clicked for perusal by a user is automatically selected.

In this embodiment, the retrieval object is character data such as a document. However, the retrieval object is not limited thereto. For example, the present invention is also applicable to a retrieval object such as an image that is visually recognized or a retrieval object such as music that is aurally recognized.

Other than the foregoing, it is possible to selectively use or properly modify the configuration described in the foregoing preferred embodiment without departing from the gist of the present invention.

It is to be understood that the specific embodiments of the invention that have been described are merely illustrative of certain application of the principle of the present invention. Numerous modifications may be made to a method for determining numerical representations for categorical data fields and data processing system invention described herein without departing from the spirit and scope of the present invention.

What is claimed is:

1. A processor-implemented method for retrieving a stored target document, comprising:
    receiving an initial search from a user in a search session based on a keyword;
    receiving a user selection of a document that has been selected from a result of the initial search;
    conducting an extended search based on the selected document;
    based on the extended search, extracting a group of analogous documents to which the selected document belongs, from a plurality of groups of analogous documents;
    wherein each group of analogous documents is formed of analogous documents that have been concurrently selected in response to previous retrieval requests and that have been stored for future extended searches;
    returning an analogous document search result representing the extracted group of analogous documents;
    identifying analogous documents in the group of analogous documents that satisfy the extended search; and
    automatically generating a new group of analogous documents based on the selected document and the identified analogous documents for future extended searches.

2. The method of claim 1, wherein identifying the analogous documents comprises identifying analogous documents in the extracted group of documents, which have been selected by the user.

3. The method of claim 1, wherein identifying the analogous documents comprises determining frequencies of co-occurrence between the selected document and the analogous documents in the extracted group of analogous documents.

4. The method of claim 3, further comprising identifying an associated document from the analogous documents in the extracted group of analogous documents, with a frequency of co-occurrence exceeding a predetermined threshold;

designating the associated document as a target document; and automatically extracting the target document.

5. The method of claim 1, wherein generating the new group of analogous documents comprises generating the new group based on the target document and the identified analogous documents for future extended searches; and further comprising storing the new group of analogous documents for future extended searches.

6. A computer program product having instruction codes stored on a computer-readable medium for retrieving a stored target document, comprising:

a set of instruction codes for receiving an initial search from a user in a search session based on a keyword;

a set of instruction codes for receiving a user selection of a document that has been selected from a result of the initial search;

a set of instruction codes for conducting an extended search based on the selected document, based on the extended search;

a set of instruction codes for extracting a group of analogous documents to which the selected document belongs, from a plurality of groups of analogous documents;

wherein each group of analogous documents is formed of analogous documents that have been concurrently selected in response to previous retrieval requests and that have been stored for future extended searches;

a set of instruction codes for returning an analogous document search result representing the extracted group of analogous documents;

a set of instruction codes for identifying analogous documents in the group of analogous documents that satisfy the extended search; and a set of instruction codes for automatically generating a new group of analogous documents based on the selected document and the identified analogous documents for future extended searches.

7. The computer program product of claim 6, wherein the set of instruction codes for identifying the analogous documents identifies analogous documents in the extracted group of documents, which have been selected by the user.

8. The computer program product of claim 6, wherein the set of instruction codes for identifying the analogous documents determines frequencies of co-occurrence between the selected document and the analogous documents in the extracted group of analogous documents.

9. The computer program product of claim 8, further comprising a set of instruction codes for identifying an associated document from the analogous documents in the extracted group of analogous documents, with a frequency of co-occurrence exceeding a predetermined threshold;

a set of instruction codes for designating the associated document as a target document; and a set of instruction codes for automatically extracting the target document.

10. The computer program product of claim 6, wherein the set of instruction codes for generating the new group of analogous documents generates the new group based on the target document and the identified analogous documents for future extended searches; and further comprising a set of instruction codes for storing the new group of analogous documents for future extended searches.

11. A processor-implemented system for retrieving a stored target document, comprising:

means for receiving an initial search from a user in a search session based on a keyword means for receiving a user selection of a document that has been selected from a result of the initial search;

means for conducting an extended search based on the selected document, based on the extended search;

means for extracting a group of analogous documents to which the selected document belongs, from a plurality of groups of analogous documents;

wherein each group of analogous documents is formed of analogous documents that have been concurrently selected in response to previous retrieval requests and that have been stored for future extended searches;

means for returning an analogous document search result representing the extracted group of analogous documents;

means for identifying analogous documents in the group of analogous documents that satisfy the extended search; and means for automatically generating a new group of analogous documents based on the selected document and the identified analogous documents for future extended searches.

12. The system of claim 11, wherein the means for identifying the analogous documents identifies analogous documents in the extracted group of documents, which have been selected by the user.

13. The system of claim 11, wherein the means for identifying the analogous documents determines frequencies of co-occurrence between the selected document and the analogous documents in the extracted group of analogous documents.

14. The system of claim 13, further comprising means for identifying an associated document from the analogous documents in the extracted group of analogous documents, with a frequency of co-occurrence exceeding a predetermined threshold;

means for designating the associated document as a target document; and means for automatically extracting the target document.

15. The system of claim 1, wherein the means for generating the new group of analogous documents generates the new group based on the target document and the identified analogous documents for future extended searches; and further comprising means for storing the new group of analogous documents for future extended searches.

* * * * *